Figure 3:
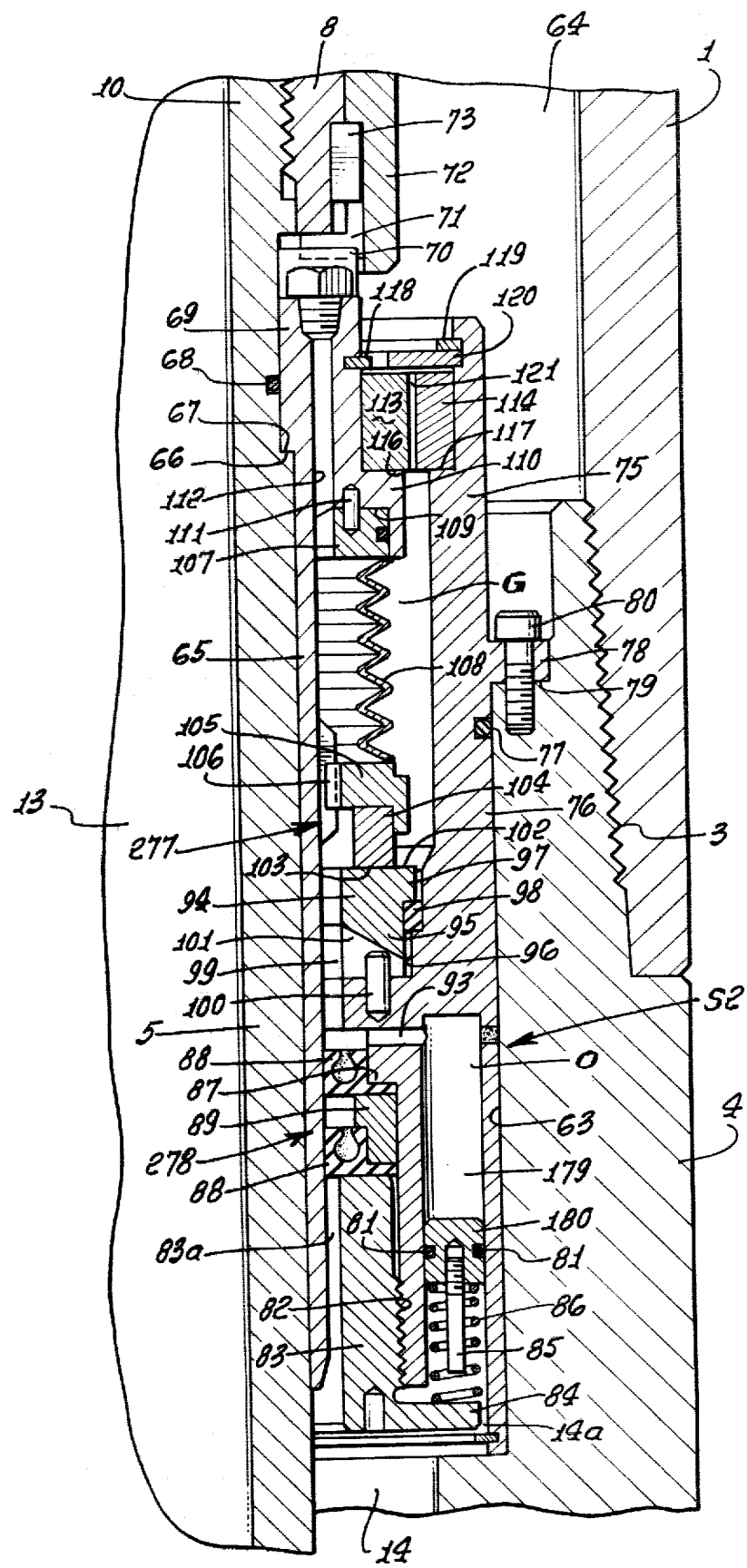

# United States Patent [19]

Tschirky et al.

[11] 4,329,127
[45] May 11, 1982

[54] SEALED BEARING MEANS FOR IN HOLE MOTORS

[75] Inventors: John E. Tschirky, Long Beach; Bela A. Geczy, Glendale, both of Calif.

[73] Assignee: Smith International, Inc., Newport Beach, Calif.

[21] Appl. No.: 127,657

[22] Filed: Mar. 6, 1980

Related U.S. Application Data

[63] Continuation of Ser. No. 818,423, Jul. 25, 1977, abandoned.

[51] Int. Cl.³ .......................... F03C 2/22; E21B 4/02; F16J 15/40; F16C 33/76
[52] U.S. Cl. ..................................... 418/48; 175/107; 277/27; 308/187
[58] Field of Search .......................... 418/48; 415/502; 175/107; 308/187, 187.1; 277/27, 88

[56] References Cited

U.S. PATENT DOCUMENTS

| | | | |
|---|---|---|---|
| 2,646,962 | 7/1953 | Wagner | 175/107 |
| 2,907,611 | 10/1959 | Robinson | 308/187.1 |
| 3,145,787 | 8/1964 | Brown | 175/107 |
| 3,659,662 | 5/1972 | Dicky | 175/107 |
| 3,807,513 | 4/1974 | Kern et al. | 175/107 |
| 4,019,591 | 4/1977 | Fox | 175/107 |

FOREIGN PATENT DOCUMENTS 538429 7/1956 Italy ..................................... 175/107

*Primary Examiner*—John J. Vrablik

*Attorney, Agent, or Firm*—Philip Subkow; Bernard Kriegel

[57] ABSTRACT

An in hole fluid motor for driving a drill bit utilizing the circulation of drilling fluid to drive the motor, having a sealed bearing assembly. The bearing assembly has a hollow, rotary drive shaft disposed within a tubular relatively stationary housing with radial bearings and thrust bearings disposed between the drive shaft and housing. Sealing structures are provided between the drive shaft and housing in axially spaced relation with the bearings disposed in a chamber between the sealing structures and lubricated by a lubricant confined by the sealing structures and pressurized through a diaphragm by the pressure of fluid externally of the housing in the drill hole. One of the sealing structures has a pair of clean fluid reservoirs separating the bearing lubricant from the drilling fluid in the housing by a pair of sealing devices, one between the bearing lubricant and a first of the clean fluid reservoirs and the other between the first and the second clean fluid reservoirs. In the two forms shown, drilling fluid in the housing pressurizes the second reservoir. In one of these forms, drilling fluid in the housing also pressurizes the first reservoir, and in the other form, lubricant in the bearing chamber pressurizes the first reservoir. The pressure difference between motor fluid upstream of the bit and in the drill hole is sealed by a high pressure seal operating in the clean fluid provided in the reservoirs, and the total volume of the drilling fluid circulates through the bit nozzles.

29 Claims, 5 Drawing Figures

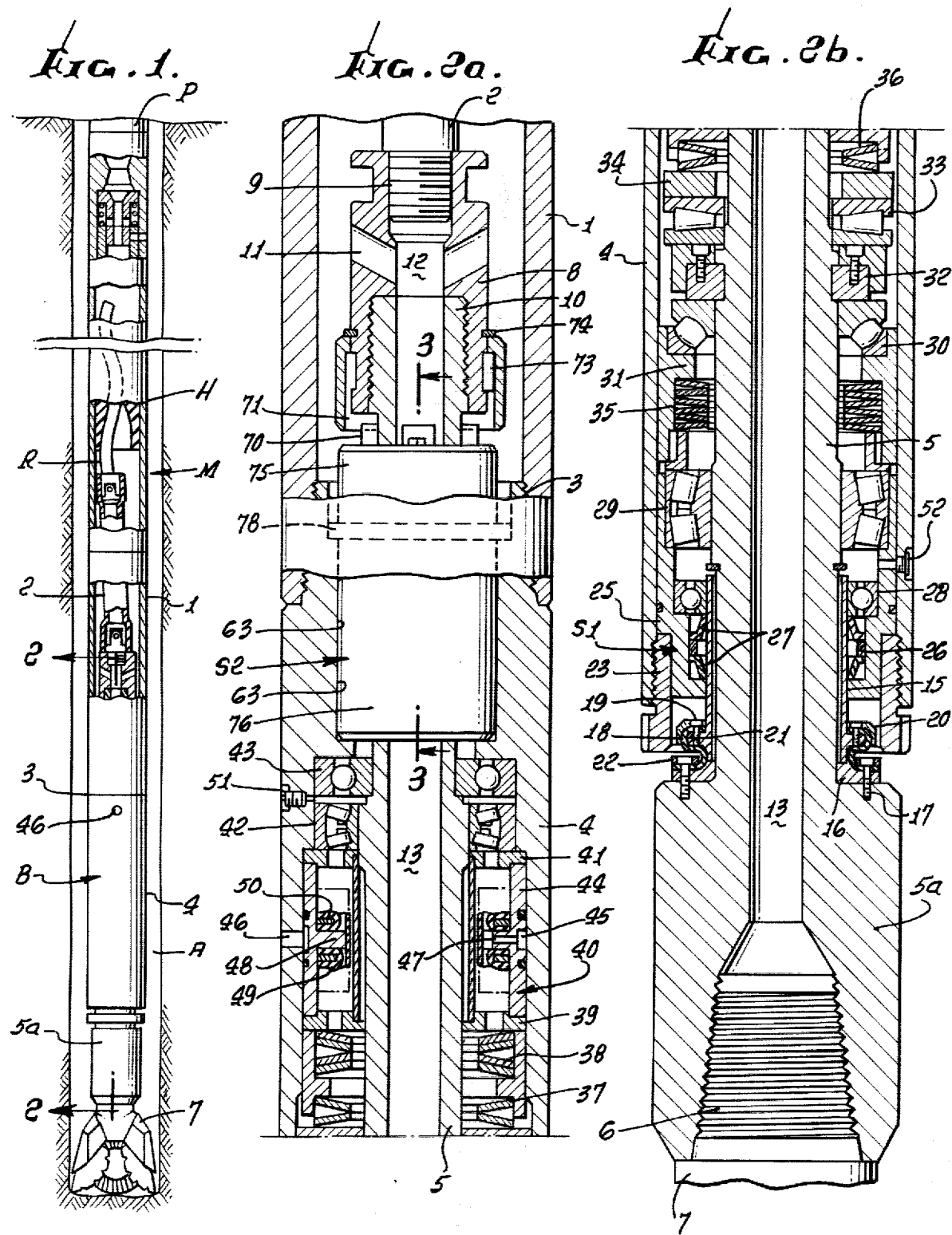

SEALED BEARING MEANS FOR IN HOLE MOTORS

This is a continuation of application Ser. No. 818,423, filed July 25, 1977, now abandoned.

This invention relates to a bearing assembly for use in combination with a downhole or in hole fluid driven motor which drives a rotary drill bit, through which drilling fluid is discharged through bit nozzles during the drilling operation to flush away cuttings as the drilling progresses.

In the drilling of bore holes into or through the earth, as in the case of drilling oil and/or gas wells or in certain mining or other earth boring operations, a practice has been to drive the drill bit by a fluid motor installed in a drill pipe string and through which drilling fluid is circulated to drive the fluid motor and then pass through the bit nozzles into the drill hole to flush away cuttings, the drilling fluid and entrained cuttings returning to the drilling rig or to the surface through the annulus outside drill pipe string and outside the motor. During the drilling, the drill bit is forced against the formation being drilled through. In the case of the drilling of well bores such as oil and gas wells, the drill string applies weight to the bit, and such weight is transferred through a bearing assembly which rotatably supports a hollow drive shaft within an elongated housing. The drive shaft is driven by the rotor of the fluid motor, while the bearing housing is fixed to the drill pipe string and remains relatively stationary. In some instances the drill pipe string may also be rotated by the drilling rig, but in any event, the drive shaft, to which the drill bit is attached, rotates within the bearing housing, and the bearing means between the drive shaft and the housing must sustain severe vibration, shock, axial and radial loading.

Such bearing assemblies have heretofore been provided, wherein a portion of the drilling fluid itself has been allowed to circulate through the bearing structures between the drive shaft and the housing, and more recently, as disclosed, for example, in U.S. Pat. No. 3,894,818, granted July 15, 1975 to John E. Tschirky and U.S. Pat. No., 3,982,859, granted Sept. 28, 1976 to John E. Tschirky and Bela A. Geczy, the bearing assemblies have been sealed at opposite ends of an annular bearing chamber between the drive shaft and the housing, and a lubricant or lubricating fluid has been employed to fill the bearing chamber. The lubricant in the chamber was pressurized, in the case of the structures of the above-identified patents, by the provision of a diaphragm in the bearing chamber which was exposed through a port in the bearing housing to the pressure of drilling fluid in the well bore annulus outside the housing. However, during the drilling operations, there is a substantial pressure differential between the drilling fluid inside the drill string and flowing through the drive shaft and the pressure of drilling fluid in the well bore annulus tending to force the drilling fluid through the sealing means at the upper end of the bearing chamber. The breakdown of the sealing means which prevents the admission of drilling fluid into the bearing chamber can result in substantially diminished effective life of the bearing means, requiring that the drill string be pulled and the bearing means be replaced. Accordingly, as also disclosed in the two above-identified patents, it became the practice to substantially equalize the pressure differential across the sealing means by allowing a portion of the drilling fluid being circulated downwardly through the drive shaft to bypass the flow path through the drive shaft and exit through the bearing housing above the sealing means into the annular space outside the bearing housing. Since the ability of the drilling fluid to remove cuttings from the bore hole as the drilling progresses depends upon the flow of drilling fluid through the nozzles or jet orifices of the drill bit, the bypass of drilling fluid results in an inherent reduction in the volume of drilling fluid flowing through the bit, and flow restrictors have been provided to minimize the loss of drilling fluid to the annulus through the bypass flow path. Notwithstanding the efforts, as described above, to enhance the life of the seal means for the bearing chamber, the sealing means was nevertheless exposed to the drilling fluid which inherently contains small abrasive particles resulting from the drilling operation, notwithstanding the passage of the drilling fluid at the drilling rig through separating means as the drilling fluid is being recirculated. Accordingly, the effective life of the downhole motor drill combination has been to some extent limited by the ability of the bearing chamber seal to prevent the intrusion of the particulate material and drilling fluid into the bearing assemblies resulting in their rapid wear and errosion.

An object of the present invention is to provide a bearing assembly for use in combination with downhole fluid motors wherein the sealing means is isolated from the drilling fluid.

Another object of the invention is to provide a sealing means in a sealed bearing assembly for use with downhole fluid motors wherein it is not necessary to provide for the bypass of any of the drilling fluid to the annulus in order to substantially equalize the pressure differential across the seal for the bearing chamber.

The present invention provides a sealed bearing assembly for use with downhole fluid motors of the type generally described above, wherein the sealing means between the drive shaft and the bearing housing which is exposed to the drilling fluid within the drill pipe string is so constructed as to provide a clean oil or clean fluid barrier between the drilling fluid and the elements of the sealing assembly which have heretofore been exposed to the drilling fluid and which have retained the lubricant within the sealed bearing chamber.

More particularly, the present invention provides a sealed bearing assembly for downhole or in hole motors of the drilling fluid driven type, wherein the rotory drive shaft is disposed within a tubular relatively stationary housing, with radial bearings and thrust bearings disposed between the drive shaft and the housing in a sealed chamber containing a lubricant, the lubricant being pressurized by the drilling fluid pressure in the space outside of the bearing housing, thereby substantially equalizing the pressure across the sealing means at one end of the bearing assembly, and the sealing means at the other end of the bearing assembly, which are exposed to the prressure of drilling fluid within the drill pipe string, includes sealing means and barrier means which defines first and second chambers containing a clean fluid, such as grease or oil, which isolate the bearing chamber seal from the drilling fluid.

According to one form of the invention, an improved seal assembly is provided defining first and second clean fluid containing chambers, one of which chambers is exposed to the pressure of drilling fluid in the drill string and the other of the chambers being exposed to the pressure of fluid within the lubricating chamber for the bearings, whereby the pressure drop across one of the sealing means due to the differential pressure of drilling fluid in the drill string and in the bore annulus, occurs across a sealing device which is operating in a clean environment and the pressure across the seals which separate the bearing lubricating chamber from the other clean fluid reservoir is substantially equalized. In another form the pressure of drilling fluid in the drill string is applied to the clean fluid, such as oil or grease, in the two reservoirs of the sealing means, so that the sealing structure between the two reservoirs operates in a clean environment with substantially no differential pressure thereacross, and the sealing structure between the bearing chamber and the other of the reservoirs are operating at full differential pressure, but in a clean environment.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Figure 4:
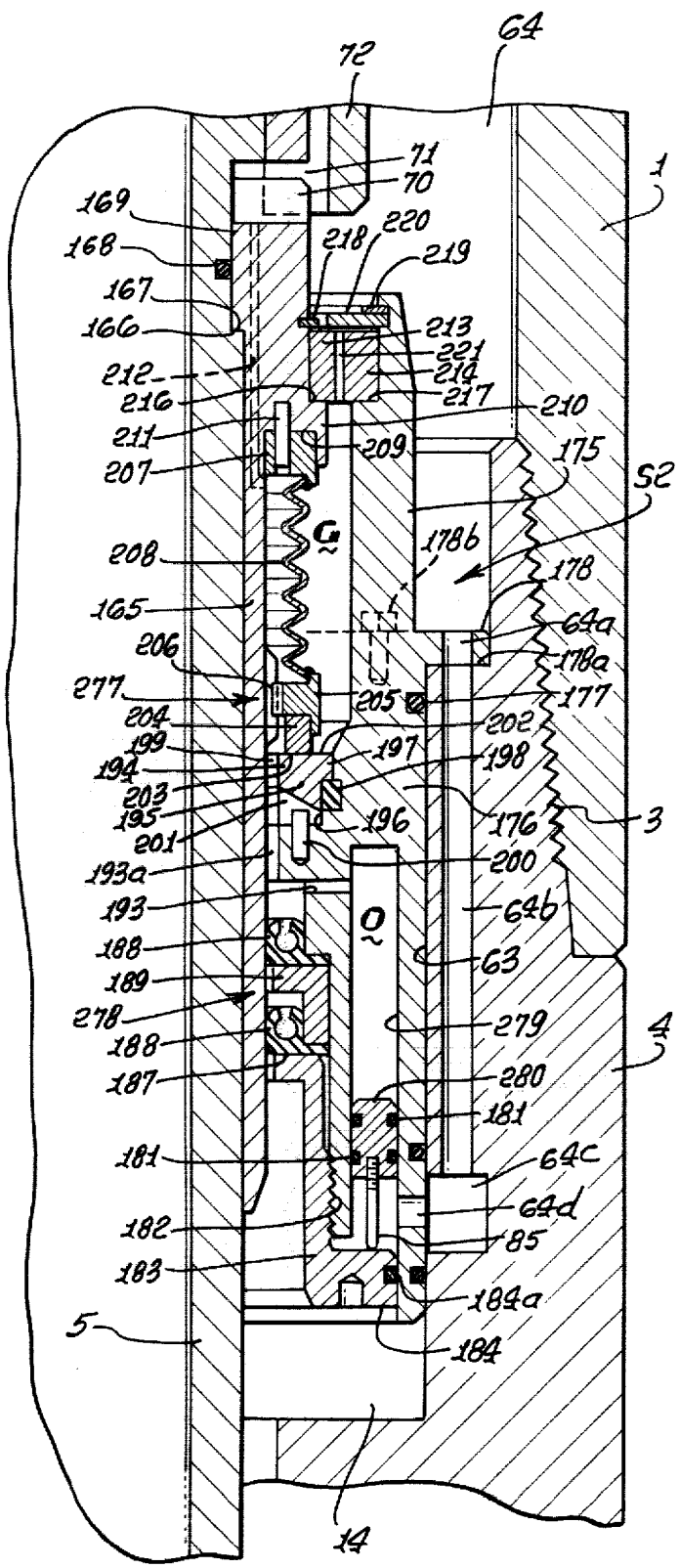

Referring to the drawings:

FIG. 1 is a view partly in elevation and partly in section showing an in hole motor and drill assembly in a borehole;

FIGS. 2a and 2b together constitute a view partly in longitudinal section and partly in elevation, showing a sealed bearing assembly for an in hole motor of the drilling fluid driven type and incorporating the invention, FIG. 2b being a downward continuation of FIG. 2a;

FIG. 3 is an enlarged fragmentary detailed view in section as taken on the line 3—3 of FIG. 2a, illustrating the seal structure according to one form of the invention; and FIG. 4 is a view corresponding to FIG. 2 but showing a seal structure according to another form of the invention.

As seen in the drawings a sealed bearing assembly B is adapted to be associated with a suitable downwhole fluid motor M, of the progressing cavity type or of the mud turbine type, wherein during the operation of the fluid motor to drill a bore hole, drilling fluid is circulated downwardly through a drill pipe string P extending to a drilling rig, and there being a connecting rod housing 1 having rotatable therein a connecting rod 2. The connecting rod housing is connected to the relatively stationary motor housing H and the rod is connected to the motor rotor R. The connecting rod housing 1 at its lower end is threadedly connected at 3 to the threaded upper end of an elongated tubular bearing housing 4 in which is rotatably disposed a drive shaft 5, the drive shaft extending downwardly through the lower end of the bearing housing 4 and having at its lower end a sub 5a internally threaded for reception of the threaded pin 6 of a bit 7 which may be of any suitable type for drilling in any particular type of earth formation. At its upper end, the drive shaft 5 is connected to the rod 2 by a coupling 8 which is threadedly connected at 9 with the lower end of the rod and threadedly receives the threaded upper end 10 of the drive shaft 5. The coupling 8 has radial fluid passages 11 communicating between the connector rod housing 1 and an internal bore 12 which in turn is in communication with the longitudinally extended fluid passage 13 through the tubular drive shaft 5, this passage 13 being adapted to conduct drilling fluid from the connecting rod housing 1 to the bit 7, the drilling fluid being discharged through nozzles or orifices in the bit to flush cuttings from the bottom of the hole and then upwardly through the annular space A in the borehole outside of the bearing housing and to the surface, all as is well known.

Between the drive shaft 5 and the housing 4, is an annular and elongated bearing chamber 14, at the lower end of which (FIG. 2b) is a lower sealing means or structure S1. Mounted within the upper end of the housing and disposed about the drive shaft 5 is an upper sealing means or sealing structure S2 (FIG. 2a).

Referring to FIG. 2b, the lower seal means S1 comprises an inner floating seal sleeve 15 which is supported in circumferentially spaced relation about the drive shaft 5 on a support ring 16 secured by fasteners 17 to the bottom sub 5a of the drive shaft, the support ring having an elastomeric annular boot 18 clamped by fastenings 19 between a clamping ring 20 and an outstanding flange 21 on the sleeve 15 and a lower clamping ring 22 which is secured to the support ring 16 by the fastening 17. At the lower end of the housing 4 is an externally threaded nut 23 providing a bottom support for a bearing and sealing sleeve 25 disposed within the body and having an internal cylindrical bore 26 opposed to the external cylindrical surface of the sealing sleeve 15 and receiving therebetween sealing ring means 27 for preventing the passage of fluid between the sealing and bearing sleeve 25 and the floating seal sleeve 15, while the boot 18 prevents the passage of fluid from the housing between the floating sleeve and the drive shaft. The sealing and bearing sleeve 25 also forms a seat for a radial bearing structure 28 disposed between the sleeve 25 and the upper end of the floating seal sleeve 15.

In vertically upwardly spaced relation from the lower seal means S1 in the housing 14 are various radial bearings and thrust bearings, as well as shock absorbing and bearing loading spring means which may take various forms, as well known in the art. In the illustrated embodiment bearing means, in addition to the radial bearings 28, include a radial bearing assembly 29 disposed between the drive shaft 5 and the bearing housing 4, above which is a thrust bearing assembly 30 engaged between a bearing sleeve 31 and a thrust ring 32, and above the thrust bearing assembly 30 is another thrust bearing assembly 33 disposed between the thrust ring 32 and an upper thrust ring 34. A lower stack of annular spring washers of the Belleville type is disposed between the radial bearing assembly 29 and the lower thrust bearing assembly 30, and a suitable number of additional sets of spring washers 36, 37, and 38 are disposed between the upper thrust bearing assembly 33 and a disc 39 at the bottom of pressure equalizing means 40. This pressure equalizing means 40 has another disc 41 at its upper end engaged beneath a radial bearing assembly 42, which is below an upper radial bearing assembly 43. All of the bearing assemblies are engaged between the drive shaft and the housing to transmit thrust downwardly from the housing to the drive shaft as the weight of the drill pipe is applied to the bit 7, as well as to minimize radial movement between the housing and the drive shaft during drilling operations, which subject the assembly to severe shock and radial loads as well as axial loads.

The pressure equalizing means 40 previously referred to, includes a cylindrical member 44 disposed between the lower disc 39 and the upper disc 41 and having an external annular groove 45 communicating with a radial port 46 in the housing whereby the pressure of fluid outside of the bearing housing in the annulus A finds access to and is applicable through radial ports 47, in an annular boss 48 within the sleeve 44, to an internal bladder 49 suitably clamped to the annular boss or flange 48 by clamping rings 50. The entire bearing chamber containing the bearings and springs described above is adapted to be filled with a lubricating fluid through a suitable filler opening 51 and bleed opening 52 closed by appropriate screw plugs after filling of the annular chamber 14. It will now be apparent that the pressure of fluid external of the housing 4 finding access through the housing port 46 establishes the internal pressure of the lubricating fluid between the lower seal assembly S1 and the upper seal assembly S2. Accordingly, pressure across the lower seal S1 is substantially equalized. The pressure across the upper seal S2, however, is the differential between the motor fluid pressure in the housing structure above or externally of the seal S2 and the reduced external pressure in annulus A, caused by the restriction in flow through the bit nozzles.

The seal structure S2, as seen in FIG. 3 is adapted to be installed between the drive shaft 5 and the upper end of the outer bearing housing 4 in an enlarged bore 63 in the latter and constitutes a barrier between the upper end of the lubricant chamber 14 and the housing structure space 64 within the connecting rod housing 1 externally of the seal. In this form, the seal structure S2 comprises an elongated cylindrical internal sealing sleeve 65 disposed about the drive shaft 5 and having a downwardly facing shoulder 66 adjacent its upper end landed upon an upwardly facing shoulder 67 on the drive shaft 5, a sealing ring 68 being disposed between the upper enlarged end 69 of the sealing sleeve 65 to prevent the bypass of fluid between the sealing sleeve and the drive shaft. If desired, the sealing sleeve 65 may be mounted upon the drive shaft 5 so as to provide radial clearance therebetween, whereby the sealing sleeve can essentially float like the sleeve 15. Means are provided for causing the sealing sleeve 65 to rotate with the drive shaft 5. As shown, such means comprises a suitable number of upstanding drive lugs 70 at the upper end of the sealing sleeve, engaged with complemental drive lugs 71 provided internally of a connector or drive sleeve 72, which in turn has a keyed connection or other rotary drive connection 73 with the connector head or nut 8. This sleeve 72 is held against upward displacement relative to the connector 8 by a suitable stop ring 74.

Disposed within the bore 63 of the bearing housing 4 is an elongated seal housing structure 75 including a hollow body 76 carrying a side ring seal 77 engaged in the bore 63, and having an external circumferentially extended flange 78 seated against an upwardly facing shoulder 79 in the bearing housing 4 and secured in place by a suitable number of circumferentially spaced fasteners 80. Defined between the seal housing 76 and the inner seal sleeve 65 are a first reservoir G and a second reservoir O. The reservoir G is adapted to contain a body of a clean, fluent material, such as grease and the reservoir O is adapted to contain a quantity of a clean fluent material, such as oil, with mechanical sealing means generally denoted at 277 separating the grease from the oil, and with lip-type sealing means 278 isolating the oil in the second reservoir O from the lubricant in the lubricant chamber 14, within the bearing housing.

In the lower end of the seal housing 75 is a downwardly opening annular cylinder or piston chamber 179 having therein an annular pressure transfer piston 180 provided with opposite side ring seals 81 slidably engaged within the annular cylinder 179. Threadedly engaged within an internal bore 82 of the seal housing is a seal retainer sleeve 83 having an outwardly projecting end flange 84. This end flange 84 provides means for limiting outward movement of the annular piston 180 which has a suitable number of stop pins 85 projecting downwardly therefrom and engageable with the flange 84. These pins also constitute centering devices for a suitable number of coiled compression springs 86 disposed about the pins 85 and engaged between the piston 180 and the flange 84. Disposed between the upper end of the seal retainer sleeve 83 and a downwardly facing internal shoulder 87 on the seal housing is a suitable number of elastomeric cup seals 88 having external flanges respectively engaged with the housing shoulder 87 and a spacer ring 89 between the seal flanges. Radial ports 90 in the inner cylinder wall communicate between the cylinder 79 and an annular space 91 provided by the spacer ring 89 and then through radial ports 92 therein with the space between the axially spaced cup seals 88. Another suitable number of radial ports 93 communicate between the upper end of the annular cylinder 179 and the space between the seal housing and the seal sleeve above the upper cup seal 88.

The mechanical seal means 277 comprises a stationary seal ring 94, composed of wear resistant materials, such as silicon carbide, the seal ring 94 having a body 95 disposed within a reduced bore 96 provided within the seal housing and an end flange 97 disposed within a larger bore and providing a shoulder for engagement with a suitable resilient seal ring 98 disposed between the seal ring flange 97 and the opposed shoulder on the body. The seal ring 94 has its inner periphery spaced from the sealing sleeve 65 to provide an annular clearance 99 therebetween, and rotation of the seal ring 94 with respect to the housing is prevented by a suitable number of circumferentially spaced pins 100 engaging in companion slots 101 provided in the seal ring body. The upper end surface 102 of the seal ring 94 is radial and, as is typical of seal rings of this type, is lapped to provide a flat sealing surface engageable by the opposed, radial, lapped sealing surface 103 of a rotatable seal ring 104, which may be composed of wear-resistant materials such as tungsten carbide, and which is supported in a seal carrier ring 105, having a splined connection 106 with the seal sleeve 65, so as to be rotatable therewith, whereby the seal ring 104 rotates relative to the stationary seal ring 94. Extending axially between the seal carrier ring 105 and an upper carrier ring 107 is a suitable bellows 108 of welded or fabricated construction attached to the carrier ring 105 and to the upper ring 107, the ring 107 in turn being engaged in a recess 109 in the radially outwardly projecting flange 110 provided on the sealing sleeve 65. The support ring 107 is suitably pinned or keyed at 111 to the seal sleeve 65 for rotation therewith.

It will now be seen that the mechanical seal means 277 isolates the reservoir G from the reservoir O, and that the reservoir O communicates with the annular space within the bellows 108 through the annular space 99 and the radial ports 93 extending between the annular space and the annular cylinder 179 and through the splined connection 106.

The reservoir O is adapted to be filled with oil by suitable means, such as a filler opening 112, with air being forced from the reservoir and from the annular space between the mechanical seal means 277 and the bellows 108 through any suitable exhaust port. The reservoir O and the spaces between the mechanical seal means and the lip or cup seal means are filled with the clean oil, and thereafter the reservoir G can be filled with a further quantity of clean substance such as a grease which will be on the exterior of the mechanical seal means. The reservoir G is adapted to communicate with the annular space 64 within the connecting rod housing 1 through a pair of circumferentially spaced rings 113 and 114, with the ring 113 seating on an upwardly facing radial shoulder 116 of the sealing sleeve flange 110, and the ring 114 seating on an upwardly facing shoulder 117 provided on the seal housing 75. The flow restricting ring 113 is held in place by a suitable snap ring 118 engaged within the seal sleeve 65, while the flow restricting ring 114 is held in place by a snap ring 119 engaged in the seal housing and also retaining in place a disc or annular shield 120 which extends circumferentially about and loosely covers the annular gap 121 defined between the rings 113 and 114.

As previously indicated, the lubricant chamber 14 within the bearing housing 14 is pressurized by the pressure of fluid in the annular space in the drill hole outside of the bearing housing, by means of the bladder in the pressure equalizing means 40. This same pressure is applicable to the annular piston 180 through an annular gap 14a defined between the seal retaining sleeve flange 84 and the outer annular wall of the annular piston chamber of cylinder 179. On the other hand, the pressure of fluid in the annular space 64 within the connecting rod housing 1, externally of the seal s2, is applicable to the grease or other fluid in the reservoir G through the annular gap 121 between the rings 113 and 114. As previously indicated, the pressure of the lubricant in the lubricant chamber 14 acting on the annular seal piston 180, is less than the pressure acting in the annular space 64 and on the grease in reservoir G by an amount determined by the pressure drop through the orifices or nozzles of the drilling bit, disregarding for the purposes of this disclosure the other differences in pressure which may be caused by flow velocities and the differences in hydrostatic pressures, depending on the length of the bearing housing.

Accordingly, during operation of the device there is a pressure differential across the opposed radial sealing faces 102 and 103 of the mechanical sealing means 77 substantially equivalent to the differential pressure between the lubricant chamber 14 and the annular space 64 within the connecting rod housing. This differential pressure across the radial sealing faces 102 and 103 is substantially equalized across the sealing faces by a pressure gradient, though during use there may be a small flow of the grease G from the reservoir G across the radial sealing faces into the internal annular space supplied with oil under pressure from the reservoir O. On the other hand, the lip or cup seals 88 are exposed to substantially equal pressures, corresponding to the pressure of lubricant in the bearing lubricant chamber 14, which is present in the annular space 83a between the seal support sleeve 83 and the lowermost sealing cup ring 88, is present in the axial space between the sealing cups 88, and is also present in the annular space 99 above the uppermost sealing cup 88. In this form the sealing cups 88 are not relied upon as pressure seals but merely as unpressurized barriers between the lubricant in the bearing lubricating chamber 14 and the oil or clean fluid in the reservoir O, and the high differential pressure is sealed by the mechanical sealing means 277.

It will now be apparent that during use of the device with the respective seal means 77 and 78 constituting barriers between the reservoir G, the reservoir O, and the lubricant chamber 14 of the bearing housing, the contaminated drilling fluid is effectively precluded from contacting the mechanical seal means 277 by the grease within the reservoir G, and even after a period of use if the grease G becomes contaminated with particulate material from the mud, such particulate material will be, for a time, prevented from passing between the mechanical seal rings, and thereafter the bearings in the bearing housing will be protected until leakage between the mechanical seal rings has substantially displaced the oil from the reservoir O, if leakage occurs between the seal rings 88 and the rotating seal sleeve 65. Thus, the bearings within the bearing housing are protected for a sufficient period of time to allow the drilling operations to continue for an economic period of time, without requiring that the drill string be pulled from the drill hole to enable servicing of the bearing assembly.

The seal structure S2, as seen in FIG. 4 is adapted to be installed between the drive shaft 5 and the upper end of the outer bearing housing 4, in an enlarged bore 63, in the latter, and constitutes a barrier between the upper end of the lubricant chamber 14 and the annular space 64 within the connecting rod housing 1. In this form, the seal structure S2 comprises an elongated cylindrical internal sealing sleeve 165 disposed about the drive shaft 5 and having a downwardly facing shoulder 166 adjacent its upper end landed upon an upwardly facing shoulder 167 on the drive shaft 5, a sealing ring 168 being engaged with the upper enlarged end 169 of the sealing sleeve 65 to prevent the bypass of fluid between the sealing sleeve and the drive shaft. If desired, the sealing sleeve 65 may be mounted upon the drive shaft 5 so as to provide radial clearance therebetween, whereby the sealing sleeve can essentially float to accommodate a certain amount of play of the shaft during the drilling operations. Means are provided for causing the sealing sleeve 165 to rotate with the drive shaft 5. As shown, such means comprises a suitable number of upstanding drive lugs 70 at the upper end of the sealing sleeve, engaged with complemental drive lugs 71 provided internally of a connector or drive sleeve 72, which in turn has the keyed connection or other rotary drive connection 73 (FIG. 1a) with the connector head or nut 8. This sleeve 72 is held against upward displacement relative to the connector 8 by a suitable stop ring 74.

Disposed within the bore 73 of the bearing housing 4 is an elongated seal housing structure 175 including a hollow body 176 carrying a side ring seal 177 engaged in the bore 63, and having an external circumferentially extended flange 178 seated against an upwardly facing shoulder 178a in the bearing housing 4 and secured in place by a suitable number of circumferentially spaced fasteners 178b, one of which is shown in broken lines. Defined between the seal housing 175 and the inner seal sleeve 65 are a first reservoir G and a second reservoir O. The reservoir G is adapted to contain a body of clean, fluent material such as grease, and the reservoir O is adapted to contain a quantity of clean, fluent material such as oil with mechanical sealing means generally denoted at 277 separating the grease from the oil, and with lip-type sealing means 278 separating the oil in the second reservoir O from the lubricant in the lubricant chamber 14 within the bearing housing.

In the lower end of the seal housing 75 is a downwardly opening annular cylinder 279 having therein an annular pressure transfer piston 280 provided with opposite side ring seals 181 slidably engaged within the annular cylinder 279. Threadedly engaged within an internal bore 182 of the seal housing is a seal retainer sleeve 183 having an outwardly projecting end flange 184 at the outer periphery of which is a side seal 184a, closing the lower end of the cylinder 279. This end flange 84 provides means for limiting outward movement of the annular piston 280 which has a suitable number of stop pins 85 projecting downwardly therefrom and engageable with the flange 84.

Disposed between the upper end of the seal retainer sleeve 183 and a downwardly facing internal shoulder 187 on the seal housing is a suitable number of elastomeric cup seals 188, having external flanges respectively engaged with the housing shoulder 187 and a spacer ring 189 between the seal flanges. A suitable number of radial ports 193 communicate between the upper end of the annular cylinder 279 and the annular space 193a between the seal housing and the seal sleeve 165 above the upper cup seal 188.

The mechanical seal means 277 comprises a stationary seal ring 194, composed of wear resistant materials such as silican carbide, the seal ring 194 having a body 195 disposed within a reduced bore 96 provided within the seal housing and an end flange 197 disposed within a larger bore and providing a shoulder for engagement with a suitable resilient seal ring 198 disposed between the seal ring flange 197 and the opposed shoulder on the body. The seal ring 194 has its inner periphery spaced from the sealing sleeve 165 to provide an annular clearance 199 therebetween, and rotation of the seal ring 194 with respect to the housing is prevented by a suitable number of circumferentially spaced pins 200 engaging in companion slots 201 provided in the seal ring body. The upper end surface 202 of the seal ring 94 is radial, and, as is typical of seal rings of this type, is lapped to provide a flat sealing surface engageable by the opposed radial lapped sealing surface 203 of a rotatable seal ring 204, which may be composed of wear-resistant material such as tungsten carbide, and which is supported in a seal carrier ring 205 having a splined connection 206 with the seal sleeve 65, so as to be rotatable therewith, whereby the seal ring 204 rotates relative to the stationary seal ring 194. Extending axially between the seal carrier ring 205 and an upper carrier ring 207 is a suitable bellows 208 of welded or fabricated construction attached to the carrier ring 205 and to the upper ring 207, the ring 207 in turn being engaged in a recess 209 in the radially outwardly projecting flange 210 provided on the sealing sleeve 65. The support ring 207 is suitably pinned or keyed at 211 to the seal sleeve 65 for rotation therewith.

It will now be seen that the mechanical seal means 277 isolates the reservoir G from the reservoir O, and that the reservoir O communicates with the annular space within the bellows 208 through the annular space 199 and the radial ports 193 extending between the annular space and the annular cylinder 279 and through the splined connection 206.

The reservoir O is adapted to be filled with oil by suitable means, such as a filler opening 212, with air being forced from the reservoir and from the annular space between the mechanical seal means 277 and the bellows 208 through any suitable exhaust port, (not shown). The reservoir O and the spaces between the mechanical seal means and the lip or cup seal means are filled with the clean oil, and thereafter the reservoir G can be filled with a further quantity of clean substance such as a grease which will be on the exterior of the mechanical seal means. The reservoir G is adapted to communicate with the annular space 64 within the connecting rod housing 1 through a pair of circumferentially spaced flow restricting rings 213 and 214, with the ring 213 seating on an upwardly facing radial shoulder 216 of the sealing sleeve flange 210, and the ring 214 seating on an upwardly facing shoulder 217 provided on the seal housing 175. The flow restricting ring 213 is held in place by a suitable snap ring 218 engaged within the seal sleeve 65, while the flow restricting ring 214 is held in place by a snap ring 219 engaged in the seal housing and also retaining in place a disc or annular shield 220 which extends circumferentially about and loosely covers the annular gap 221 defined between the flow restricting rings 213 and 214 to shield the gap against the entry of errosive particles.

As previously indicated, the lubricant chamber 14 within the bearing housing 14 is pressurized by the pressure of fluid in the annular space in the drill hole outside of the bearing housing, by means of the bladder in the pressure equalizing means 40. The pressure of fluid in the annular space 64 within the connecting rod housing 1 is applicable to the grease or other fluid in the reservoir G through the annular gap 221 between the flow restricting rings 213 and 214.

While in the embodiment shown in FIG. 3 the oil in reservoir O is pressurized by the pressure of lubricant in the chamber 14 so that the sealing means 278 is a low pressure or equalized pressure seal, the structure of FIG. 4 is such that the sealing means 278 is a high pressure seal and the oil in reservoir O is pressurized by the high pressure motor fluid or drilling fluid in the housing structure externally of the seal means S2. For this purpose, the seal housing flange 178 has a port 64a opening between the housing space 64 and an elongated passage 64b in the bearing housing 4. The passage 64b leads to an annular groove 64c formed internally of the bearing housing, and one or more radial ports 64d in the seal housing body 176 communicate between the groove 64c and the piston chamber 279 below the annular piston 280. Thus, drilling fluid pressure upstream of the bit is applied to the oil in reservoir O, and the sealing means 278 have a pressure difference thereacross equal to the difference between pressure internally of the housing structure above or externally of the seal means S2 and the reduced pressure in the drill hole annulus outside of the housing structure and in the lubricating chamber 14. Likewise, the pressure in the reservoir O is at the inside of the mechanical seal ring faces 202 and 203, substantially equalizing the pressure in the grease reservoir G, at the outside of the seal faces, so that the sealing means 277 is a low pressure or equalized pressure seal or barrier between the grease in the reservoir G and the oil in reservoir O.

It will now be apparent that during use of the device of FIG. 4, with the respective seal means 277 and 278 constituting barriers between the reservoir G, the reservoir O, and the lubricant chamber 14 of the bearing housing, the contaminated drilling fluid is effectively precluded from contacting the mechanical seal means 277 by the grease within the reservoir G, and even after a period of use if the grease G becomes contaminated with particulate material from the mud, such particulate material will be prevented from passing between the mechanical seal rings, and the bearings in the bearing housing will be protected for a substantial period, even if leakage occurs between the seal rings 188 and the rotating seal sleeve 65. Since these seal rings 188 are operating in a clean fluid environment, they can withstand the differential pressure, without wearing out prematurely. Thus, the bearings within the bearing housing are protected for a sufficient period of time to allow the drilling operations to continue for an economic period of time, without requiring that the drill string be pulled from the drill hole prematurely.

Form the foregoing it will now be apparent that the present invention provides a sealed bearing assembly for use with downhole drilling motors wherein the sealing means between the drive shaft and the bearing housing which must resist the differential pressure between the inside of the connecting rod housing and the drill hole annulus are protected from exposure to the deleterious effects of exposure to the drilling fluid and the errosive particles contained therein, as in the case of the prior art devices. Moreover, it is not necessary to equalize internal pressure and external pressure across the seal assembly, by allowing a certain amount of by-pass flow to the bore hole, to prevent the pressure differential from acting across the sealing means, and the total volume of drilling fluid is circulated through the bit throughout the drilling operation.

We claim:

1. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of fluid in either said chamber or the motor fluid discharging from said stator in said housing structure externally of said chamber; said drive shaft having a port opening between said flow passage and said housing structure externally of said chamber for the flow of motor fluid through said drive shaft.

2. In a sealed and lubricated bearing assembly as defined in claim 1 said means for pressurizing said clean fluid including means subjecting said pressure transfer means to the pressure of fluid in said chamber.

3. In a sealed and lubricated bearing assembly as defined in claim 1 said means for pressurizing said clean fluid including means subjecting said pressure transfer means to the pressure of fluid in said housing structure externally of said chamber.

4. In a sealed and lubricated bearing assembly as defined in claim 1 said pressure transfer means comprising piston means between said clean fluid and the fluid in one of said chamber and said housing structure externally of said chamber.

5. In a sealed and lubricated bearing assembly as defined in claim 1 said pressure transfer means comprising piston means between said clean fluid and the fluid in said chamber.

6. In a sealed and lubricated bearing assembly as defined in claim 1 said pressure transfer means comprising piston means between said clean fluid and the motor fluid in said housing structure externally of said chamber.

7. In a sealed and lubricated bearing assembly as defined in claim 1 said pressure transfer means comprising piston means having equal areas exposed to said clean fluid and the fluid in said one of said chambers and said housing structure externally of said chamber.

8. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of fluid in either said chamber or the motor fluid discharging from said stator in said housing structure externally of said chamber; said drive shaft having a port opening between said flow passage and said housing structure externally of said chamber for the flow of motor fluid through said drive shaft; said one of said sealing structures having additional reservoir means for a clean fluid between said seal means and said housing structure externally of said chamber, and means subjecting the clean fluid in said additional reservoir means to the pressure of motor fluid in said housing structure externally of said chamber.

9. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of fluid in either said chamber or the motor fluid discharging from said stator in said housing structure externally of said chamber; said drive shaft having a port opening between said flow passage and said housing structure externally of said chamber for the flow of motor fluid through said drive shaft; said one of said sealing structures including an additional reservoir means for a clean fluid, and means subjecting the clean fluid in said additional reservoir means to the pressure of motor fluid in said housing structure externally of said chamber.

10. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of the lubricant in the chamber; said drive shaft having a port opening between said flow passage and said housing structure externally of said chamber for the flow of motor fluid through said drive shaft; said one of said sealing structures defining an additional reservoir means for a clean fluid, and means subjecting the clean fluid in said additional reservoir means to the pressure of motor fluid in said housing structure externally of said chamber.

11. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of the motor fluid discharging from said stator in said housing structure externally of said chamber; said drive shaft having a port opening between said flow passage and said housing structure externally of said chamber for the flow of motor fluid through said drive shaft; said one of said sealing structures defining an additional reservoir means for a clean fluid, and means subjecting the clean fluid in said additional reservoir means to the pressure of motor fluid in said housing structure externally of said chamber.

12. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of fluid in either said chamber or the motor fluid discharging from said stator in said housing structure externally of said chamber; said drive shaft having a port opening between said flow passage and said housing structure externally of said chamber for the flow of motor fluid through said drive shaft; said one of said sealing structures having additional reservoir means for a clean fluid between said seal means and said housing structure externally of said chamber, and means subjecting the clean fluid in said additional reservoir means to the pressure of motor fluid in said housing structure externally of said chamber, including a restricted passage between said additional reservoir means and said housing structure externally of said chamber.

13. In a sealed and lubricated bearing assembly for use with a fluid motor having a stator housing, and a motor fluid driven rotor said rotor rotated by motor fluid passing through said stator: an elongated tubular housing structure; a drive shaft having a flow passage therethrough and rotatable in said housing structure and having means at one end connectible with the motor rotor, the other end of said drive shaft projecting from said housing structure; a pair of axially spaced sealing structures between said housing structure and said drive shaft adjacent the ends thereof and defining therewith a bearing chamber adapted to contain a liquid lubricant; means responsive to fluid pressure externally of said housing structure for pressurizing said liquid lubricant between said sealing structures; axial and radial bearing means in said chamber engaged between said housing structure and said drive shaft for transmitting axial and radial loads between said housing structure and said drive shaft; one of said sealing structures being adjacent said one end of said drive shaft and reservoir means adapted to contain a clean fluid and said last named sealing structure including seal means separating said chamber from said reservoir and exposed only to fluid in said chamber and said reservoir and means including pressure transfer means for isolating clean fluid in said reservoir from and pressurizing said clean fluid responsive to the pressure of fluid in either said chamber or the motor fluid discharging from said stator in said housing structure externally of said chamber; said drive shaft having a port opening between said flow passage and said housing structure externally of said chamber for the flow of motor fluid through said drive shaft; said one of said sealing structures having additional reservoir means for a clean fluid between said seal means and said housing structure externally of said chamber, and means subjecting the clean fluid in said additional reservoir means to the pressure of motor fluid in said housing structure externally of said chamber, including a restricted passage between said additional reservoir means and said housing structure externally of said chamber, the other of said sealing structures being exposed to the pressure of fluid in said chamber and the pressure of fluid externally of said housing structure.

14. In a sealed and lubricated bearing assembly as defined in claim 13; said seal means of said one of said sealing structures including first and second seal means, said first seal means being elastomeric sealing ring means rotatably sealingly engaged between said housing structure and said drive shaft, said second seal means being a pair of mechanical sealing rings fixed to said housing structure and rotatable with said drive shaft and having opposed seal faces.

15. In a sealed and lubricated bearing assembly as defined in claim 13; said seal means of said one of said sealing structures including first and second seal means, said first seal means being elastomeric sealing ring means rotatably sealingly engaged between said housing structure and said drive shaft, said second seal means being a pair of mechanical sealing rings fixed to said housing structure and rotatable with said drive shaft and having opposed seal faces and a bellows between said reservoir means and sealingly engaged with one of said mechanical sealing rings and one of said housing structure and said drive shaft.

16. In a sealed and lubricated bearing assembly as defined in claim 14; said seal means of said one of said sealing structures including first and second seal means, said first seal means being elastomeric sealing ring means rotatably sealingly engaged between said housing structure and said drive shaft, said second seal means being a pair of mechanical sealing rings respectively fixed to said housing structure and rotatable with said drive shaft and having opposed seal faces, bellows between said reservoir means and sealingly engaged with one of said mechanical sealing rings and one of said housing structure and said drive shaft, said pressure transfer means being between said first-mentioned reservoir means and the fluid in said chamber.

17. In a sealed and lubricated bearing assembly as defined in claim 16; and said first seal means having means also subjecting said elastomeric sealing ring means to the pressure of fluid in said chamber opposing the pressure of clean fluid in said first-mentioned reservoir means.

18. In a sealed and lubricated bearing assembly as defined in claim 16; said means for pressurizing said clean fluid in said first-mentioned reservoir means including means subjecting said pressure transfer means to the pressure of fluid in said housing externally of said chamber.

19. In a sealed and lubricated bearing assembly as defined in claim 16; said means for pressurizing said clean fluid in said first-mentioned reservoir means including means subjecting said pressure transfer means to the pressure of fluid in said housing externally of said chamber, and said first seal means having means also subjecting said elastomeric sealing ring means to the pressure to fluid in said chamber opposing the pressure of clean fluid in said first-mentioned reservoir means.

20. In a sealed and lubricated bearing assembly as defined in claim 16; said pressure transfer means comprising piston means between said clean fluid in said first-mentioned reservoir means and the fluid in said chamber.

21. In a sealed and lubricated bearing assembly as defined in claim 16; said pressure transfer means comprising piston means between said clean fluid in said first-mentioned reservoir means and the fluid in said housing structure externally of said chamber.

22. A sealed bearing assembly for use with a fluid driven in hole motor connectible in a fluid conducting pipe string to drive a rotary bit, comprising: a tubular bearing housing; a tubular drive shaft in said housing defining an annular space therebetween; bearing means between said housing and said drive shaft; first and second sealing structures sealing said annular space at opposite sides of said bearing means and defining with said housing and said drive shaft a bearing chamber adapted to contain a bearing lubricant; said housing having means for isolating said lubricant from external fluid and responsive to external fluid pressure for pressurizing said lubricant and equalizing pressure across said first sealing structure; said second sealing structure having high pressure sealing means and low pressure sealing means therein defining first and second reservoirs for containing a clean fluid interposed between said bearing chamber and said annular space externally of said bearing chamber; means for pressurizing the fluid in one of said reservoirs by the pressure of fluid in one of said bearing chamber and said annular space externally of said bearing chamber; and means for pressurizing the other of said reservoirs by the pressure of fluid from said annular space externally of said bearing chamber; said high pressure sealing means sealing against the pressure difference between fluid in said annular space externally of said bearing chamber and fluid in said bearing chamber; said low pressure sealing means sealing the substantially equalized pressure of the fluid in said one of said reservoirs and the fluid in one of said chamber and said annular space externally of said bearing chamber.

23. A sealed bearing assembly as defined in claim 22; said means for pressurizing the fluid in said one of said reservoirs being responsive to the pressure of fluid in said bearing chamber, said low pressure sealing means being between said one of said reservoirs and said bearing chamber, said high pressure sealing means being between said reservoirs.

24. A sealed bearing assembly as defined in claim 22; said means for pressurizing the fluid in said one of said reservoirs being responsive to the pressure of fluid in said annular space externally of said bearing chamber, said low pressure sealing means being between said reservoirs, said high pressure sealing means being between said one of said reservoirs and said bearing chamber.

25. In a fluid motor drill adapted to be installed in a drilling pipe string to be operated by drilling fluid circulated through the drilling string and returning through the drilled hole annulus outside of the drilling string: a motor including a stator having means connectable with the drill string; a rotor in said stator rotatable by the flow of drilling fluid through said stator; a tubular bearing housing connected with said stator; a tubular drive shaft extending through said bearing housing and connected with said rotor at one end; the other end of said drive shaft extending from said bearing housing; bearing means engaged between said housing and said drive shaft supporting said drive shaft for rotation and for axial loading of said drive shaft; first seal means between said housing and said other end of said drive shaft; second seal means between said one end of said drive shaft and said housing and spaced from said first seal means; means between the seal means defining a space for a clean fluid, pressure transfer means for isolating said space between said seal means from and responsive to the pressure of fluid externally of said housing for pressurizing said clean fluid when positioned in the space between said seal means; said second seal means including means defining another space for another clean fluid and sealing elements between said drive shaft and said housing separating said clean fluid spaces and exposed only to the fluid in said clean fluid spaces; means separating said another clean fluid in said another space from the fluid in said housing externally of said second sealing means, said drive shaft having a port leading from said housing to said tubular drive shaft for the flow of motor fluid from said stator and housing into said drive shaft.

26. For use with a fluid motor drill adapted to be installed in a drilling pipe string to be operated by drilling fluid circulated through the drilling string and returning through the drilled hole annulus outside of the drilling string: a motor including a stator having means connectible with the drill string; a rotor in said stator rotatable by the flow of drilling fluid through said stator; a tubular bearing housing connected with said stator; a shaft extending through said bearing housing and connected with said rotor at one end of said shaft; the other end of said shaft extending from said bearing housing for connection with a bit; first seal means between said housing and said other end of said shaft; second seal means between said one end of said shaft and said housing spaced from said first seal mean, the space between said seal means adapted to contain a lubricant; bearings engaged between said housing and said shaft between said first and second seal means and engaged with said shaft and said housing supporting said shaft for rotation and axial loading of said shaft; pressure transfer means responsive to the pressure of fluid externally of said housing for pressurizing the lubricant in said housing between said seal means; means defining a chamber for clean fluid; sealing elements between said drive shaft and said housing sealingly engaged between said lubricant and said clean fluid chamber and exposed only to the lubricant and the fluid in said clean fluid chamber; pressure transfer means for pressurizing the clean fluid in said chamber in response to the pressure of fluid in said housing externally of said second sealing means; said drive shaft having a port for the flow of motor fluid from said stator and housing through said drive shaft.

27. For use with a fluid motor drill adapted to be installed in a drilling pipe string to be operated by drilling fluid circulated through the drilling string and returning through the drilled hole annulus outside of the drilling string: a motor including a stator having means connectible with the drill string; a rotor in said stator rotatable by the flow of drilling fluid through said stator; a tubular bearing housing connected with said stator; a shaft extending through said bearing housing and connected with said rotor at one end of said shaft; the other end of said shaft extending from said bearing housing for connection with a bit; first seal means between said housing and said other end of said shaft; second seal means between said one end of said shaft spaced from said first seal means, the space between said seal means and said housing adapted to contain a lubricant; bearings engaged between said housing and said shaft between said first and second seal means and engaged with said shaft and said bearing supporting said shaft for rotation and axial loading of said shaft; pressure transfer means responsive to the pressure of fluid externally of said housing for pressurizing the lubricant in said housing between said seal means; a chamber for clean fluid; sealing elements between said drive shaft and said housing sealingly engaged and between said lubricant and said clean fluid chamber and exposed only to the lubricant in said housing and the fluid in said clean fluid chamber; pressure transfer means for pressurizing the clean fluid in said chamber in response to the pressure of fluid externally of said housing; said drive shaft having a port for the flow of motor fluid from said stator and housing through said drive shaft.

28. In a fluid motor drill adapted to be installed in a drilling pipe string to be operated by drilling fluid circulated through the drilling string and returning through the drilled hole annulus outside of the drilling string: a motor including a stator having means connectable with the drilling string; a rotor in said stator rotatable by the flow of drilling fluid through said stator; a tubular bearing housing connected with said stator to receive drilling fluid discharged from said stator; a tubular drive shaft extending through said bearing housing and connected with said rotor at one end; the other end of said drive shaft extending from said bearing housing; said drive shaft having an opening for the flow of drilling fluid from said housing through said drive shaft and through a bit at said other end of said drive shaft; first seal means between said other end of said drive shaft and said housing; second seal means between said one end of said drive shaft and said housing; bearing means between said first and second seal means in thrust and radial load transfer relation between said shaft and said housing; a reservoir for a first clean fluid; pressure transfer means responsive to the pressure of fluid externally of said housing for pressurizing said first clean fluid; said second seal means defining a second reservoir for a second clean fluid and having seal elements between said drive shaft and said housing and separating said first and second clean fluid reservoirs and exposed only to the fluid in said reservoirs; and pressure transfer means responsive to the pressure of said high pressure drilling fluid in said housing to pressurize said second reservoir.

29. In a fluid motor adapted to be installed in a drilling pipe string to be operated by drilling fluid circulated through the drilling string and returning through the drilled hole annulus outside of the drilling string: a motor including a stator having means connectable with the drilling string; a rotor in said stator rotatable by the flow of drilling fluid through said stator; a tubular bearing housing connected with said stator to receive drilling fluid discharged from said stator; a tubular drive shaft extending through said bearing housing and connected with said rotor at one end; the other end of said drive shaft extending from said bearing housing; said drive shaft having an opening for the flow of drilling fluid from said housing through said drive shaft; a first seal between said housing and the end of said drive shaft extending from said housing; a second seal between said one end of said drive shaft and said housing; bearing means between said first and second seals in thrust and radial load transfer relation between said shaft and said housing; a reservoir for a first clean fluid; pressure transfer means responsive to the pressure of fluid externally of said housing for pressurizing said first clean fluid in said reservoir; said second seal separating said first clean fluid reservoir from high pressure drilling fluid in said housing; a second reservoir for a second clean fluid; said second seal also including a seal element between said drive shaft and said housing and separating said first and second clean fluid reservoirs and exposed only to the fluid in said reservoirs; and pressure transfer means responsive to the pressure exerted by said high pressure drilling fluid in said housing to pressurize said second reservoir.

* * * * *